INVENTOR
Mario Romoli

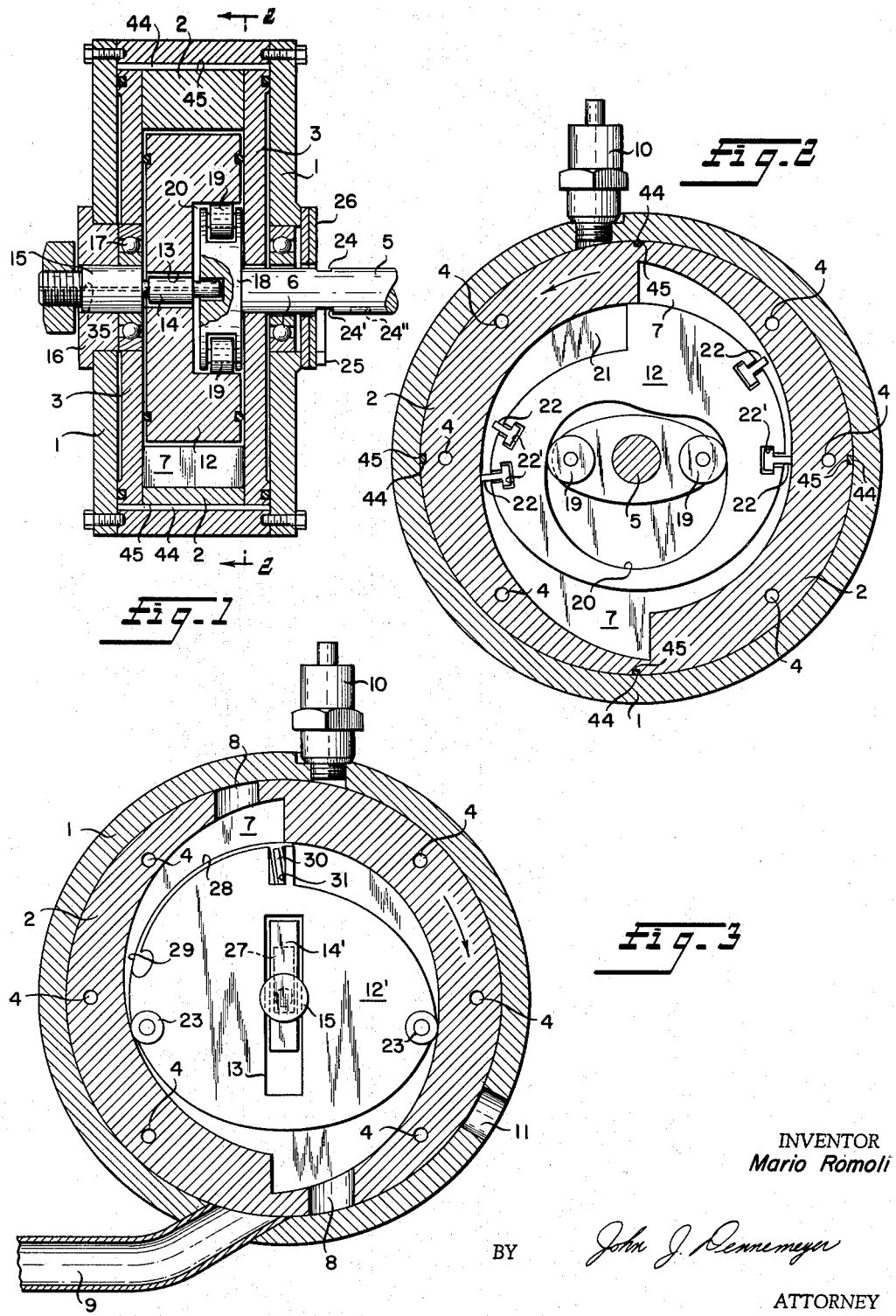

Dec. 7, 1965    M. ROMOLI    3,221,715
ROTARY INTERNAL COMBUSTION ENGINE
Filed March 2, 1962    3 Sheets-Sheet 3
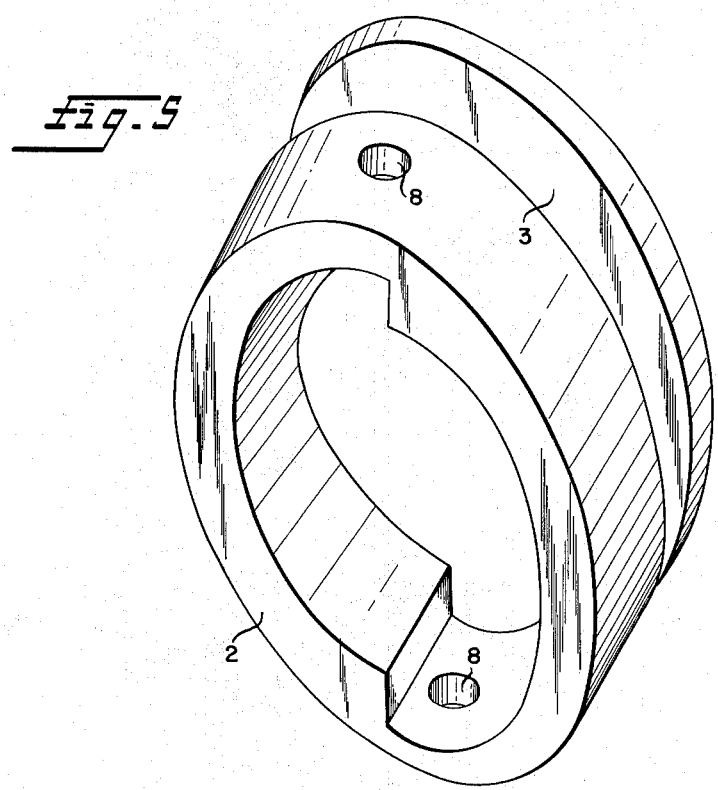
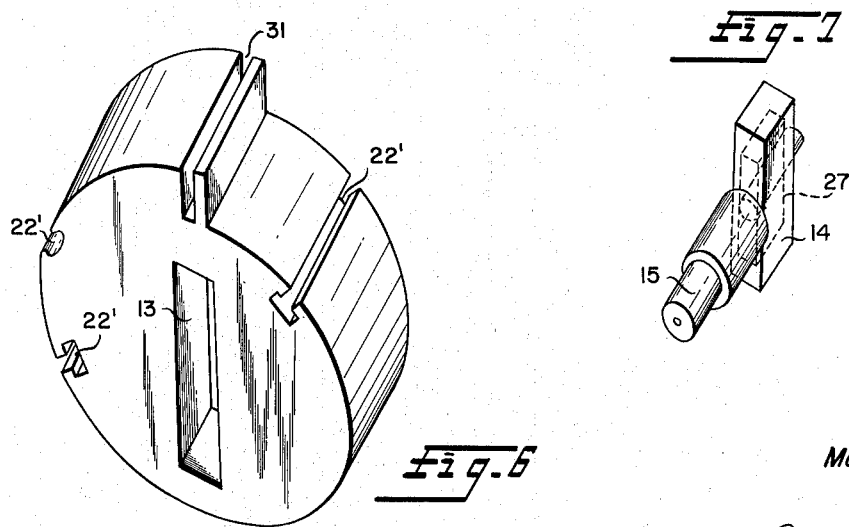
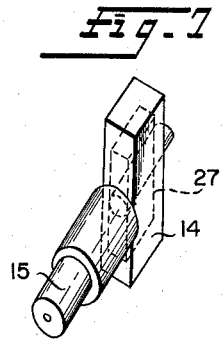
INVENTOR
Mario Romoli
BY *John J. Dennemeyer*
ATTORNEY

United States Patent Office 3,221,715
Patented Dec. 7, 1965

3,221,715
ROTARY INTERNAL COMBUSTION ENGINE
Mario Romoli, 133 Via dei Serragli, Florence, Italy
Filed Mar. 2, 1962, Ser. No. 177,035
Claims priority, application Italy, Mar. 9, 1961,
4,363/61
13 Claims. (Cl. 123—8)

The invention relates to a double-acting, rotary internal combustion engine offering extremely simple constructional features and very high performance characteristics, so as to prove far more economical and practical, as well as being more powerful than any of the types of internal combustion engines built to date and, in particular, more so than the other types of rotary internal combustion engines designed and built up to now.

The absence of internal gears, of operated valves, connecting rods and pistons cuts down the number of component parts of this engine to a minimum and gives the engine much greater solidity and sturdiness, greatly reducing the probability of troubles or breakdowns, and the simplicity of its construction, together with the absence of any such delicate members, easily subject to damage, gives the engine greater resistance to wear compared with existing rotary internal combustion engines.

The fact that this engine has two complete cycles for each 360° revolution of the drive shaft gives double the performance for the same number of revolutions, and the special shape of the inner core of the engine, designed to give a maximum seal to aid in maintaining vacuum during the intake stroke and to maintain compression during the compression stroke, also achieves as a further advantage, a greater power at lower r.p.m. compared to other rotary internal combustion engines designed to date.

The rotary engine embodying this invention can operate either as a gasoline or similar type internal combustion engine with electrical ignition system, or as a diesel engine and in both cases gives much higher performance than existing types of such engines.

Given the compactness of the engine embodying this invention, it can be applied to the widest possible number of uses and one could, for example, have one engine constructed in conformity with this invention applied to each axle of each wheel of a motor vehicle with evident extraordinary saving in space and increase in power of the vehicle.

The rotary engine embodied in this invention comprises, essentially, a cylindrical housing, inside of which a ring rotates, said ring being integral with the drive shaft of the engine, said rotating ring having an approximately circular inner cavity, except for the presence of two semi-lunes which are left empty, being added to the outside circumference of said inner cavity and located at points diametrically opposite one another to form the two combustion chambers, said combustion chambers being each equipped with an opening which passes through said rotating ring to said ring's outer circumference, each of said openings coming during each 360° rotation into communication with the intake manifold carrying the fuel-air mix in the case of a gasoline-engine type application, or coming into communication with the air inlet, in case of a diesel-engine type application, after which said openings, one after the other, come into communication with the spark-producing member in the case of a gasoline-engine type application, or with a fuel injector in case of a diesel-engine type application, openings thence coming into communication with the exhaust manifold, there being situated inside the inside cavity of said rotating ring a central core together with a suitable seal for same, said core being guided in the rotating ring, for example by means of projections engaging annular grooves of the ring and either fixed or free to slide on a shaft fixed to the cylindrical housing, said core being devised in such a manner as to bring about a cyclical variation in the volume of the combustion chambers, hence automatically and simultaneously generating in said chambers the various phases or "strokes" comprising the full cycle of the engine.

During one complete 360° cycle of the ring's rotation, there will be two back-and-forth oscillations of the core, and two active or power phases or strokes, one for each combustion chamber.

The cycle starts with the intake phase from a suitable manifold, after which the mixture is compressed during the first 180° due to the reduction in the overall volume of said chamber, until the compression, being completed upon reaching 180°, the power phase commences upon occurrence of the explosion, which means that the sparking member is located on the cylindrical housing at a position almost diametrically opposite the intake manifold; the active, expanding phase of the power stroke lasts 120° of rotation of the ring, hence the exhaust manifold is located on the cylindrical housing 120° after the sparking member; the remaining 60° for the return to the intake position are used to build up a new vacuum to aid in the intake, itself, which must occur over a very brief period of time.

Naturally, since there are two combustion chambers, during this one 360° cycle, the same phases will be occurring simultaneously but 180° out of phase with the first, also in the second combustion chamber.

The various forms of central core devised and with hollow inside are especially designed to provide as tight a seal as can be obtained and for an intake and compression operation which will not constitute a negative phase in the distribution of the gas, as well as being designed to use the expansion of the gas in the combustion chamber until all of the thrust created by the explosion has been completely utilized, in particular, to give the engine double the efficiency of that offered by other rotary engines, even when rotating at lower r.p.m.

Given the fact that the central core has a special inner shape, the cooling of the engine can be achieved equally well whether air, water, or oil is used as the cooling medium, said fluid being made to flow through a channel located axially in the shaft fixed to the cylindrical housing serving as a guide for said core.

The seal for the central core and for the rotating ring is provided, for example, by means of movable rods, rings, or similar members and the friction of the core is decreased by means of suitable bearings.

The rotary engine embodying the invention also offers the special feature of enabling the distributor to be operated directly by the drive shaft; it is, in fact, provided that two cams or planes in diametrically opposite positions on the drive shaft can be used to open the distributor points twice during each rotation of said drive shaft, or two sets of distributor points, separate from one another may be provided, being operated independently of one another by two cams or planes alternating with one another on the drive shaft, each of the two sets of points exciting the sparking member once during each revolution.

A first type of central core to be used in union with the rotating ring of the engine embodied in this invention is a core having almost circular form, but without one of the semilunes having a shape complementary to that of the combustion chamber, said core oscillating back and forth inside the ring's circular cavity, said oscillating motion being controlled by a cam provided on the drive shaft so that the portion of the central core designed to have the semilune in it will successively come in contact with the combustion chambers during rotation of the ring, generating a cyclical change in the volumes of the combustion chambers, said changes in volume being created and increased by the oscillating motion of the core, thus automatically and simultaneously producing the phases in the two combustion chambers.

A second type of central core has a similar form to that herein described above and also moves back and forth being guided by the shaft fixed to the housing, but it has a mobile semilune having a shape identical to that of the combustion chambers when the maximum compression and combustion takes place, said mobile semilune, pivoting at its thinnest end, being guided by suitable means to have an oscillating motion synchronized with the cycle of the engine so that the volume of the combustion chamber will be reduced at the moment of maximum compression, further increasing said pressure or compression and giving greater elasticity to the motion.

A third type of central core has, instead, a circular shape and is pinned to the shaft fixed to the housing, said core being equipped with two mobile semilunes operating in synchronism, one being located at the same position as that described comprising the second type above and the other semilune being located at the position diametrically opposite, so as to have an overall shape almost complementary in respect to the cavity of the engine's rotating ring; in this third type the variations in the volumes of the two combustion chambers, given the fact that the core is fixed, are given exclusively by the back and forth motion of the two semilunes guided by suitable means, that is, while one semilune is being moved outwards, reducing the volume of one combustion chamber, the other semilune returns toward the core, enlarging the volume of the other combustion chamber and vice versa.

In the two last described types above, the motion of the semilunes can be regulated by various types of systems, for example, by means of cams, plungers, springs, or by means of the gas, itself, inside the combustion chambers.

Lastly, the change in volume of the combustion chamber to provide the intake, compression and exhaust phases can be achieved by either causing the central core to have a back and forth motion or by keeping the central core fixed and simultaneously moving the two semilunes protruding from it with a back and forth motion, or by means of a system combining the two, that is, with oscillating central core with a single semilune which, in its own right, is capable of being moved with a back-and-forth motion.

Some typical examples of forms of embodiment of the rotary engine according to the invention are shown in the accompanying drawings, which are intended to illustrate several preferred forms of the invention purely by way of example and non-restrictive of the invention, itself, wherein:

FIG. 1 is a top view, sectioned along the line I—I in FIG. 2, of a first form of embodiment of the invention;

FIG. 2 is a side view, sectioned along the line II—II in FIG. 1, of the same form of embodiment as shown in FIG. 1;

FIG. 3 is a side view but seen from the opposite side as that shown in FIG. 2, of a modified form of embodiment of the invention;

FIG. 5 is an axonometric view of the rotating ring embodying the invention with its sealing disc;

FIG. 6 is an axonometric view of the central core of the engine, to be placed inside the ring shown in FIG. 5;

FIG. 7 is an axonometric view of the guide for the central core in FIG. 6, fixed to the shaft integral with the outside housing of the engine.

It is understood that in the various figures in the drawings, identical reference numbers or letters indicate the same or similar parts or phases.

Figure 4:
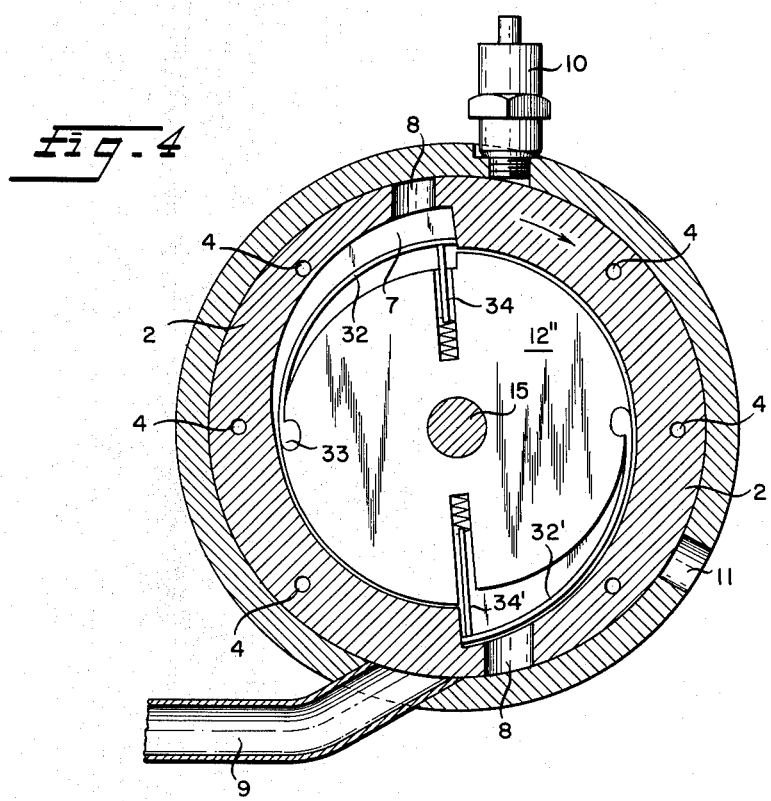
FIG. 4 is a side view, similar to that shown in FIG. 3, of another, different form of embodiment of the invention.

In reference to FIGS. 1, 2, 5, 6 and 7, these figures show an engine embodying this invention, using a first form of embodiment of the central core.

The engine comprises a cylindrical housing 1 inside which rotates a ring 2, having the special shape shown in FIG. 5, enclosed by two flat discs 3 fixed to said ring 2 by means of bolts 4 or other suitable means; this ring 2 is integral with drive shaft 5, which rotates in a hole of housing 1, bearing 6 being interposed between drive shaft 5 and housing 1, said ring 2 enclosing a hollow space almost circular in cross-section, excepting the presence of two empty, semilune-shaped areas 7 (FIGS. 2 and 5) which extend beyond the circumference of said hollow space and which are arranged at positions diametrically opposite one another, forming the combustion chambers of said engine, said combustion chambers being each equipped with an opening 8 which opens out on the outside surface of ring 2, so that each opening 8, during 360° of rotation of ring 2 inside housing 1 will come to find itself in communication successively with the fuel mixture or air intake manifold 9, with the sparking member or fuel injector 10 and with the exhaust manifold 11.

A central core 12 is situated inside the almost-circular hollow space enclosed by ring 2 in such a manner as to maintain a seal between core 12 and ring 2, said core 12 having a central slot 13, by means of which said core 12 can slide up and down on a key 14 protruding from a fixed shaft 15, made integral with housing 1 by nut 16 or by other suitable means or method, said shaft penetrating inside the rotating ring 2 through bearing 17.

Central core 12 has an almost circular shape (FIG. 6) but is without one of the semilunes which have a shape complementing that of the combustion chambers and said core's up and down motion is controlled by a cam 18 located at the end of drive shaft 5, said cam being equipped with two bearings 19 to eliminate the friction against the specially shaped cavity 20 of the core, itself; cam 18 rotates inside said specially shaped cavity 20 and raises and lowers the core 12 which runs, as has already been mentioned, in relation with key 14, being guided by it, while the ring 2 rotates about the core, so that the part having the shape of a semilune 21 of core 12 enters successively in contact with combustion chamber 7 during rotation of the ring, generating a cyclical change in the volume of the combustion areas, created and increased by the up and down motion of core 12, thus obtaining the phases of the two combustion chambers automatically and simultaneously.

The seal for the central core is obtained, for example, by means of movable T-shaped rods 22 located in transverse grooves 22', and rings 42 located in annular grooves 43 (FIGS. 2 and 6) or similar members, while the friction of core 12 against the walls of the ring's inner cavity is decreased by means of suitable bearings 23 (FIG. 3), the seal for the rotating ring is obtained, for example, by means of movable rods 44 disposed in transverse grooves 45 and by rings 46 located in annular grooves 47.

The engine also offers the special feature of making it possible to drive the distributor directly off the drive shaft; if, in fact, two cams or planes 24 and 24' are provided on drive shaft 5, located on opposite sides of the shaft 5, points 25 of the breaker 26 can be controlled, said breaker 26 being fixed directly to housing 1 near the hole for the drive shaft 5, twice each rotation.

It can also be provided that two sets of points, separate from one another be set in place, being operated independently of one another by two cams or planes 24 and 24" alternately on the drive shaft, each exciting the sparking member once on each revolution, for a total of twice per revolution.

With reference to FIG. 3, a type of central core 12' is shown in this figure which has a shape similar to that of the central core 12 previously described, and this core 12' also moves up and down on a fixed shaft 15, guided by a key 14', which, however, is no longer pinned to shaft 15, but is free, in turn, to move up and down on said shaft by means of central slot 27 (shown in broken lines also in FIG. 7 for purposes of illustration only).

This central core 12' has a mobile semilune 28, represented schematically having a general outline similar to that of the combustion chambers when the ring is turned to the point at which the maximum compression and the combustion takes place, said semilune 28, pivoting at point 29, being guided during its to and fro motion by a pin 30, running inside a slot 31 in the core 12' (shown for purposes of illustration also in FIG. 6), driven or operated by suitable means, for example, by the gas, itself, from the combustion chamber, by key 14' through an extension, etc.; this mobile semilune 28, which goes up in synchronism with the cycle of the engine to restrict and decrease the volume of the combustion chamber, appreciably increases the compression of the gas and gives the engine's motion greater flexibility.

In reference to FIG. 4, another type of central core 12'' is shown, which has a circular form and does not move up and down with a to and fro motion, but is absolutely fixed to shaft 15.

This central core 12'' is equipped with two mobile semilunes 32 and 32' shown schematically in the figure and arranged one in correspondence with the above mentioned point of compression and the other at the position diametrically opposite, being pivoted at points 33 and 33' and guided in their to and fro motions by rods 34 and 34' which serve the same purpose as the pin 30 of the preceding type and are actuated in the same way.

In this form of embodiment the variations in the volumes of the two combustion chambers are caused exclusively by the synchronized to and fro motions of the two semilunes 32 and 32' because the central core 12'' is fixed, that is, while one semilune is forced outwards, decreasing the volume of one combustion chamber, the other is made to move inwards towards the centre of the core, increasing the volume of the other combustion chamber and vice versa.

Given the inside shape of the central core 12, 12', 12'', the internal cooling of the engine can be achieved equally well whether using air, water or oil, said fluid flowing in through an axially located channel 35, provided in fixed shaft 15, represented in FIG. 1 by way of example, from which the fluid for lubricating the various members of the engine readily reaches said members.

Figure 8A:
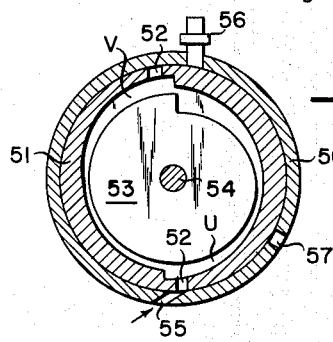
FIGS. 8A, 8B and 8C are three schematic representations of an engine embodying the invention seen in side views and showing the principal phases of the 360° cycle.
Figure 8B:
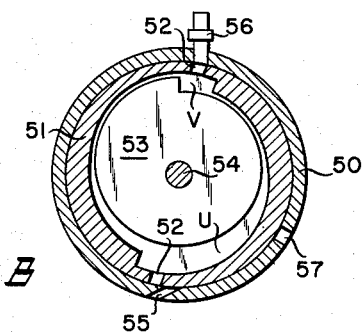
Figure 8C:
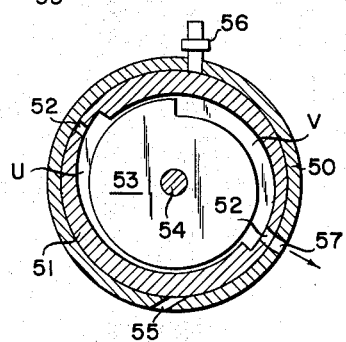

FIGS. 8A, 8B and 8C show a schematic representation of the cycle of operation of the engine embodying the invention through 360° or one revolution, presenting said engines essential and characteristic phases and it will be understood that these figures do not refer to any of the forms of embodiment in particular among those previously described in detail herein.

In these figures the reference number 50 is simply used to indicate the outer housing which encloses the rotating ring 51, with two semilunes of free space defining the combustion chambers U and V, each being provided with an opening 52 opening out to the outside of ring 51; inside of ring 51 is located the central core 53, which is represented by one of the up-and-down oscillating motion types, moving about fixed shaft 54; holes corresponding to the intake manifold port 55, the spark plug 56 and the exhaust port 57 are provided in housing 50.

The cycle starts in combustion chamber U, which starts to draw in the fuel mixture through port 55, while chamber V is approaching the point of maximum compression (FIG. 8A); the core 53 is rising upwards, compressing the fuel mixture in chamber V and drawing in the fuel mixture into chamber U by suction.

About 15° later core 53 is at its maximum point of rise and compresses the fuel mixture in chamber V to a maximum, being in communication through port 52 with spark plug 56, whereupon the explosion takes place; at the same time the intake of the mix into chamber U has just been finished (FIG. 8B).

After about 120° after the phase shown in FIG. 8A, while the core 53 has gone down all the way, generating the expansion of the burned gases in chamber V, port 52 of said chamber V arrives at the exhaust port 57, whereupon the burned gases are expelled, while the mixture in chamber U is being compressed (FIG. 8C).

After this happens the core 53 starts to go back upwards starting to create the vacuum in chamber V for the subsequent intake, until said core finds itself back in the same situation as shown in FIG. 8A after 180°, that is, after half a turn of ring 51, but with the combustion chambers inverted and, that is, with chamber V in the intake phase and chamber U in the phase of maximum compression, that is, that in a complete revolution of 360°, both the phases occur twice, half a revolution apart, once for one combustion chamber and once for the other combustion chamber, which goes through the same phases, but 180° out of phase with the phases in the opposite combustion chamber, due to their arrangement in opposite quadrants.

It will be apparent that many variants, modifications and additions can be made to the engine herein described and illustrated, such as may be carried out by experts in this field of art, and that the engine embodying the invention may be built using the most suitable materials and in the most suitable dimensions and proportions according to the requirements and contingencies of its use and construction, without, however, departing from the spirit and the scope of the invention itself, as defined in the appended claims.

I claim:
1. A rotary internal combustion engine comprising
 a stationary engine housing,
 comprising a peripheral wall having a cylindrical inner surface, and a pair of end walls,
 a power ring rotatably mounted in said housing,
 a drive shaft fixed to said power ring,
 said power ring having a cylindrical outer peripheral surface sealingly engaging said inner surface of said housing peripheral wall,
 said rotary power ring having a cylindrical inner peripheral surface and having oppositely disposed half-crescent shaped recesses in said inner peripheral surface and constituting combustion chambers,
 said combustion chambers having terminal walls at their forward end in the direction of rotation of said power ring,
 said power ring having holes therethrough, one end of said holes opening into said combustion chambers adjacent said terminal walls, and the other end of said holes opening on the outer peripheral surface of said power ring,
 said housing having an intake and an exhaust port communicating successively with said other end of said holes in said power ring,
 fuel ignition means secured to said housing and communicating with said other end of said holes in said power ring,
 a generally circular core member of lesser diameter than the diameter of said inner peripheral surface of said power ring and mounted for reciprocation within said power ring transverse to the direction of rotation of said power ring,
 a half-crescent shaped projection on said core member adapted to fit into said half-crescent shaped recesses in said power ring,
 said core member having a guide slot on one side thereof,
 a fixed shaft mounted on said housing and having a guide piece fixed thereon and engaging said guide slot,
 said core member having a cam opening on the other side thereof, wherein the peripheral surface of said opening constitutes the cam, cam follower means connected to said drive shaft and engaging said cam surface of said opening, said cam means reciprocating said core member during rotation of said drive shaft to cyclically move said shaped projection into said combustion chambers to vary their volume, and sealing means on said core member adapted to engage the inner surface of said power ring, and side wall means fixed to said power ring and extending over said core member, said drive means connected to one of said side wall means.

2. A rotary internal combustion engine according to claim 1, wherein the outer end of said half-crescent shaped projection is located a short distance before said ignition means in the direction of rotation of said power ring, said projection entering said combustion chambers to reduce their volume shortly before ignition.

3. A rotary internal combustion engine according to claim 1, wherein said intake port is located approximately diametrically opposite said ignition means.

4. A rotary internal combustion engine according to claim 1, wherein said exhaust port is located approximately 120° from said ignition means.

5. A rotary internal combustion engine according to claim 1, wherein said terminal walls extend in parallel planes axially of said power ring.

6. A rotary internal combustion engine according to claim 1, wherein said fixed shaft has an axial channel for conducting cooling means into said engine.

7. A rotary internal combustion engine according to claim 1, wherein said projection has a substantially radial slot at one end adjacent said terminal wall, an elongated sealing member extending over said projection and having an arm at one end disposed in said radial slot for movement therein, and means on said projection for securing the other end of said sealing member.

8. A rotary internal combustion engine according to claim 7, including bearing means fixed to said core member and engaging the inner surface of said power ring.

9. A rotary internal combustion engine according to claim 7, including means for biasing said arm outwardly.

10. A rotary internal combustion engine according to claim 1, including circuit breaker means fixed to said housing adjacent said drive shaft, said drive shaft having opposite cam surfaces engaged by said circuit breaker means for operation thereof during rotation of said drive shaft.

11. A rotary internal combustion engine according to claim 1, including annular grooves in the inner surface of said power ring and peripheral guide portions on said core member disposed in sliding engagement with said annular grooves.

12. A rotary internal combustion engine according to claim 1, including transverse grooves in the outer surface of said power ring, and sealing rods movably lodged in said transverse grooves for engaging the inner surface of said housing during rotation of said power ring.

13. A rotary internal combustion engine according to claim 1, including T-shaped transverse slots in the surface of said core member and T-shaped sealing rods slidably disposed in said T-shaped slots and extending therefrom to engage the inner surface of said power ring.

References Cited by the Examiner

UNITED STATES PATENTS

| 1,232,850 | 7/1917 | Saunders | 123—17 |
| 1,717,739 | 6/1929 | Seifert. | |
| 1,770,225 | 7/1930 | Blackman. | |
| 1,859,618 | 5/1932 | Cleland. | |

FOREIGN PATENTS 454,099   4/1913   France.

KARL J. ALBRECHT, *Primary Examiner.*

RALPH H. BRAUNER, JOSEPH H. BRANSON, JR., *Examiners.*